(12) United States Patent
Bassompierre et al.

(10) Patent No.: US 7,466,683 B2
(45) Date of Patent: Dec. 16, 2008

(54) SYNCHRONIZATION METHOD IN A CELLULAR TELECOMMUNICATION NETWORK, HAND-OVER METHOD, CORRESPONDING TERMINAL AND BASE STATION

(75) Inventors: Antoine Bassompierre, Paris (FR); Nathalie Goudard, Courbevoie (FR)

(73) Assignee: Wavecom, Issy-les-Moulineaux (FR)

( * ) Notice: Subject to any disclaimer, the term of this patent is extended or adjusted under 35 U.S.C. 154(b) by 477 days.

(21) Appl. No.: 10/497,225

(22) PCT Filed: Nov. 28, 2002

(86) PCT No.: PCT/FR02/04103

§ 371 (c)(1),
(2), (4) Date: Feb. 18, 2005

(87) PCT Pub. No.: WO03/047128

PCT Pub. Date: Jun. 5, 2003

(65) Prior Publication Data

US 2005/0143074 A1    Jun. 30, 2005

(30) Foreign Application Priority Data

Nov. 28, 2001    (FR) .................................. 01 15472

(51) Int. Cl.
*H04J 3/06*    (2006.01)
(52) U.S. Cl. ...................... 370/350; 370/335; 370/503; 370/509

(58) Field of Classification Search ................ 370/350, 370/324, 466, 467, 335, 503, 509; 455/552.1, 455/553.1
See application file for complete search history.

(56) References Cited

U.S. PATENT DOCUMENTS

| | | | | |
|---|---|---|---|---|
| 5,974,082 | A | * 10/1999 | Ishikawa et al. | ............ 375/141 |
| 6,081,719 | A | 6/2000 | Picha et al. | ................ 455/449 |
| 7,224,719 | B1 | * 5/2007 | Hughes et al. | ............. 375/147 |

(Continued)

FOREIGN PATENT DOCUMENTS

WO    WO 00/51393    8/2000

(Continued)

OTHER PUBLICATIONS

PCT International Preliminary Examination Report for International Application No. PCT/FR2002/004103, filed Nov. 28, 2002, date of completion Mar. 17, 2004.

(Continued)

*Primary Examiner*—Vincent P. Harper
*Assistant Examiner*—Fred A Casca
(74) *Attorney, Agent, or Firm*—Westman, Champlin & Kelly, P.A.

(57) ABSTRACT

In a cellular communication network, first and second base stations have first and second cells that at least partially overlap in a common geographic zone. In a first synchronization step, a terminal is synchronized by receiving a synchronizing signal transmitted by the first base station. In a second synchronization step, the terminal is synchronized by receiving a predetermined signal dedicated to multiple path processing that is transmitted by the second base station.

20 Claims, 6 Drawing Sheets

U.S. PATENT DOCUMENTS

| | | | |
|---|---|---|---|
| 2001/0006515 A1* | 7/2001 | Lee et al. | 370/331 |
| 2002/0072370 A1* | 6/2002 | Johansson et al. | 455/436 |
| 2003/0156626 A1* | 8/2003 | Margulis et al. | 375/147 |

FOREIGN PATENT DOCUMENTS

| | | |
|---|---|---|
| WO | WO 01/20942 A1 | 3/2001 |
| WO | WO 01/63953 A1 | 8/2001 |

OTHER PUBLICATIONS

PCT International Search Report for International Application No. PCT/FR2002/004103, filed Nov. 28, 2002, date of completion Mar. 17, 2004 (not translated).

Ovesjö Fredrik: "Ultra Physical Layer Description FDD Parts", European Telecommunication Standard, XX, XX, Jun. 25, 1998, pp. 1-41, XP002141421.

* cited by examiner

SYNCHRONIZATION METHOD IN A CELLULAR TELECOMMUNICATION NETWORK, HAND-OVER METHOD, CORRESPONDING TERMINAL AND BASE STATION

CROSS-REFERENCE TO RELATED APPLICATION

This Application is a Section 371 National Stage Application of International Application No. PCT/FR02/04103 filed Nov. 28, 2002 and published as WO 03/047128 on Jun. 5, 2003, not in English.

FIELD OF THE INVENTION

This invention is related to cellular radiotelephony. More precisely, the invention relates to synchronisation of a terminal on a mobile radio communication network cell.

BACKGROUND OF THE INVENTION

In a cellular network, for example a UMTS ("Universal Mobile Telecommunication System") type or a 3GPP ("$3^{rd}$ Generation Partnership Project") type cellular network, equipment must be synchronised on a cell before it can transmit and/or receive data quickly. Therefore, in order to optimise information transmissions from or to terminals, it is necessary to enable fast synchronisation of terminals on a cell in the network.

Synchronisation techniques are known based on the use of a dedicated channel, for example of the SCH ("Synchronisation CHannel") type. This synchronisation is usually relatively effective but it has the disadvantage that it is slow under some circumstances, particularly when the equipment moves from one cell to another and changes frequency.

Furthermore, in order to take account of the mobility of equipment in a cellular network without interrupting communications in progress, the network must manage cell transfers or "hand-overs" that enable equipment to change from cell to cell very quickly. Note that a "hand-over" is used particularly when it is preferable for terminal in communication with a fixed station (Base Station BS responsible for the management of a cell) to change the base station with which it is associated, to communicate. A "hand-over" can be used for different reasons: bad quality of radio links, saturation of a base station due to too many communications, mobility of the equipment that moves away from a first station and towards another station, better adaptation of a base station for the service requested by the terminal, etc.

This "hand-over" must be made quickly, for reasons of efficiency, quality and fluidity of the service offered to the user.

Conventionally, a relatively slow inter-frequency "hand-over" procedure is used (in other words when the frequencies of cells to which equipment is attached are different before and after the "hand-over") which generates interference.

In order to make an inter-frequency "hand-over" in a third generation radiotelephony system using a channel access technique based on a CDMA (Code Division Multiple Access), for example in a UMTS or 3GPP system, a mobile equipment has to use vacant periods in "compressed mode" to synchronise itself onto different cells in order to make power measurements on these cells. For synchronisation, the mobile equipment must listen to the primary SCH channel, then the secondary SCH channel, then the CPICH channel on which it makes the power measurement.

This technique according to prior art has the disadvantage that it has a very long synchronisation phase since vacant periods output from compressed mode are short duration.

Therefore the UMTS and 3GPP networks are defined such that before initialising a communication, the mobile equipment is already on an optimum cell which avoids the need for a "hand-over" at the beginning of a communication.

The various aspects of the invention are intended particularly to overcome these disadvantages in prior art.

More precisely, a first purpose of the invention is to enable fast synchronisation when equipment moves from one cell to another.

Another purpose of the invention is to enable a fast "hand-over" of equipment particularly in the case of an inter-frequency "hand-over" procedure.

Another purpose of the invention is to enable the use of equipment intended for third generation mobile communication networks, requiring no or few modifications to current standards in force and particularly the UMTS FDD (Frequency Division Duplex) standard (in particular, series 25 of this standard) defined and distributed by the 3GPP ("$3^{rd}$ Generation Partnership Project") committee.

BRIEF SUMMARY OF THE INVENTION

In order to achieve this, the invention proposes a method for synchronisation of a terminal in a cellular communication network comprising several cells, including a first cell and a second cell associated with a first and a second base station respectively, the first and second cells at least partly intersecting over a geographically common area and being synchronised, and remarkable in that the method includes the following steps, when the terminal is present in the geographically common area:

a first synchronisation step onto a synchronisation signal (SCH) transmitted by the first base station and received by the terminal;

a second synchronisation step on a predetermined signal (CPICH) dedicated to the processing of multiple paths, transmitted by the second base station and received by the terminal.

In this case, the first and second cells are perfectly synchronised with each other or are pseudo-synchronised, in other words are synchronised with some synchronisation tolerance.

The first synchronisation of the terminal is perfect or quasi-perfect relative to the first base station, while it may be coarse on the second base station.

On the other hand, the second terminal synchronisation is perfect or quasi-perfect relative to the second base station.

According to one particular characteristic, the synchronisation method is remarkable in that the equipment implements a step to determine at least one path corresponding to the predetermined signal transmitted by the second base station, the determination step supplying the second synchronisation step and being implemented by means of analysing the multiple paths along which the predetermined signal passes, the path or one of the paths corresponding to the predetermined signal, called the first path, being considered as the synchronisation base.

Thus, synchronisation is relatively easily implemented on the second base station according to the invention because it uses means that have already been implemented to analyse multiple paths affecting the predetermined signal (for example the CPICH channel for the UMTS standard).

Furthermore, the invention saves pass-band and simplifies implementation on the second base station since there is no need for a specific synchronisation channel (for example the SCH channel for the UMTS standard).

According to one particular characteristic, the synchronisation method is remarkable in that the first synchronisation step tolerates synchronisation errors of the order of 5 to 50 μs relative to the second base station.

According to one particular characteristic, the synchronisation method is remarkable in that the first synchronisation step tolerates synchronisation errors of the order of 5 to 30 μs relative to the second base station.

According to one particular characteristic, the synchronisation method is remarkable in that the second synchronisation step tolerates synchronisation errors of less than 5 μs relative to the second base station.

Thus, the invention enables a relatively coarse first synchronisation of the terminal with respect to the second base station (up of 30 μS or even 50 μs) and a second fine or even perfect synchronisation of the terminal with respect to the same base station.

According to one particular characteristic, the synchronisation method is remarkable in that the first base station transmits synchronisation information to the second base station enabling synchronisation of the second base station on the first base station.

According to one particular characteristic, the synchronisation method is remarkable in that the synchronisation information is transmitted on a wire link.

According to one particular characteristic, the synchronisation method is remarkable in that the synchronisation information is transmitted through the synchronisation signal transmitted by the first base station.

According to one particular characteristic, the synchronisation method is remarkable in that a third piece of equipment transmits synchronisation information to the first base station and to the second base station enabling synchronisation of the second base station on the first base station.

Thus, it is relatively simple to implement synchronisation between the first and second base stations.

In particular, it may be implemented:
through an existing synchronisation channel (for example SCH for the UMTS) when the second base station picks up this signal transmitted by the first base station; or
by a dedicated wire link or using the network infrastructure which overcomes any problems with transmission/reception of a radio signal; or
using a third party equipment that outputs a synchronisation signal to the first station and to the base stations, which enables a fine control of synchronisation by a third equipment that may be dedicated to this purpose, or for example that may be connected to or form part of control equipment in the first and second base stations.

According to the invention, the synchronisation difference may also be controlled such that the first synchronisation of terminal on the first base station is as fine as possible with respect to the second base station. In particular, the propagation delay of the synchronisation signal transmitted by the first base station to the second base station can be taken into account. A network equipment (first base station or control equipment) could also inform the terminal about the synchronisation delay between the two base stations so that the terminal can take it into account.

The invention also relates to a method of hand-over of a terminal in a cellular communication network comprising several cells, including a first cell and a second cell associated with a first base station and a second base station respectively, the first and second cells at least partly intersecting over a geographically common area and being synchronised, and in particular the terminal being in communication mode when a communication has been set up between the terminal and a remote terminal, and in standby mode when the terminal is not in communication mode but is present and is available for a communication in one of the network cells, and is remarkable in that the terminal is present in the geographically common area, the method includes:
a first synchronisation step onto a synchronisation signal (SCH) transmitted by the first base station and received by the terminal;
a second synchronisation step on a predetermined signal (CPICH) dedicated to the processing of multiple paths, transmitted by the second base station and received by the terminal;
when the terminal in communication mode with the first base station is transferred from the first cell to the second cell.

Thus, the invention enables terminal to be transferred between two cells (or a fast "hand-over") even if the first and second base stations do not use the same frequencies.

According to one particular characteristic, the cell-to-cell transfer method is remarkable in that it uses a synchronisation method like that described above.

According to one particular characteristic, the cell-to-cell transfer method is remarkable in that the first cell surrounds the second cell and in that the first base station manages standby mode for terminals present in the first cell, the second base station being able to manage communication mode.

According to one particular characteristic, the hand-over method is remarkable in that the first base station manages opening of a communication for terminals present in the second cell, and the network then transfers management of the communication to the second base station.

The invention also relates to a terminal that will cooperate with at least a first base station associated with a first cell in the cellular communication network, in particular with the terminal possibly in communication mode, when a communication is set up between the terminal and a remote terminal, and in standby mode when the terminal is not in communication mode but is present and available for a communication in one of the network cells, and is remarkable in that it comprises:
means of making a first synchronisation on a synchronisation signal (SCH) transmitted by the first base station and received by the terminal;
means of making a second synchronisation on a predetermined signal (CPICH) dedicated to processing of multiple paths, transmitted by a second base station and received by the terminal;
a second cell in the network being associated with the second base station; and the first and second cells at least partly intersecting and being synchronised.

According to one particular characteristic, the terminal is remarkable in that the synchronisation means include means of analysing multiple paths followed by the predetermined signal, capable of determining at least one path corresponding to the predetermined signal transmitted by the second base station, the path or one of the paths corresponding to the predetermined signal, called the first path, being considered as synchronisation base.

According to one particular characteristic, the terminal is remarkable in that the first synchronisation tolerates synchronisation errors of the order of 5 to 50 μs.

According to one particular characteristic, the terminal is remarkable in that the first synchronisation tolerates synchronisation errors of the order of 5 to 30 μs.

According to one particular characteristic, the equipment is remarkable in that the second synchronisation tolerates synchronisation errors of less than 5 µs.

The invention also relates to a base station, called the second base station, that will be associated with a second cell in the cellular telecommunication network, the network comprising several cells including a first cell associated with a first base station and at least one terminal, the first and second cells intersecting at least partly on a geographically common area, remarkable in that the second base station comprises means of synchronisation on the first base station such that at least one of the terminals can implement:

- a first synchronisation step onto a synchronisation signal (SCH) transmitted by the first base station and received by the terminal; and
- a second synchronisation step on a predetermined signal (CPICH) dedicated to the processing of multiple paths, transmitted by the second base station and received by the terminal.

According to one particular characteristic, the base station is remarkable in that it comprises means of management of a terminal communication mode and that it does not include means of management of a terminal standby mode, in particular the equipment possibly being in communication mode when a communication is set up between the terminal and a remote terminal, and in standby mode when the terminal is not in communication mode but is present and available for a communication in one of the network cells.

Moreover, the invention relates to a cellular telecommunication network comprising several cells, including a first cell associated with a first base station and at least one second cell, the first cell and each of the second cells intersecting at least partly on a geographically common area and being synchronised, remarkable in that the second cell(s) is (are) each associated with at least one second base station like that described above.

The advantages of the hand-over method, the terminal, the second base station in the network are the same as the advantages of the terminal synchronisation method, and will not be described in more detail here.

BRIEF DESCRIPTION OF THE DRAWINGS

Other characteristics and advantages of the invention will become clearer after reading the following description of a preferred embodiment, given as a simple illustrative example that is in no way limitative, with reference to the attached drawings among which.

DETAILED DESCRIPTION OF PREFERRED EMBODIMENTS

Figure 1:
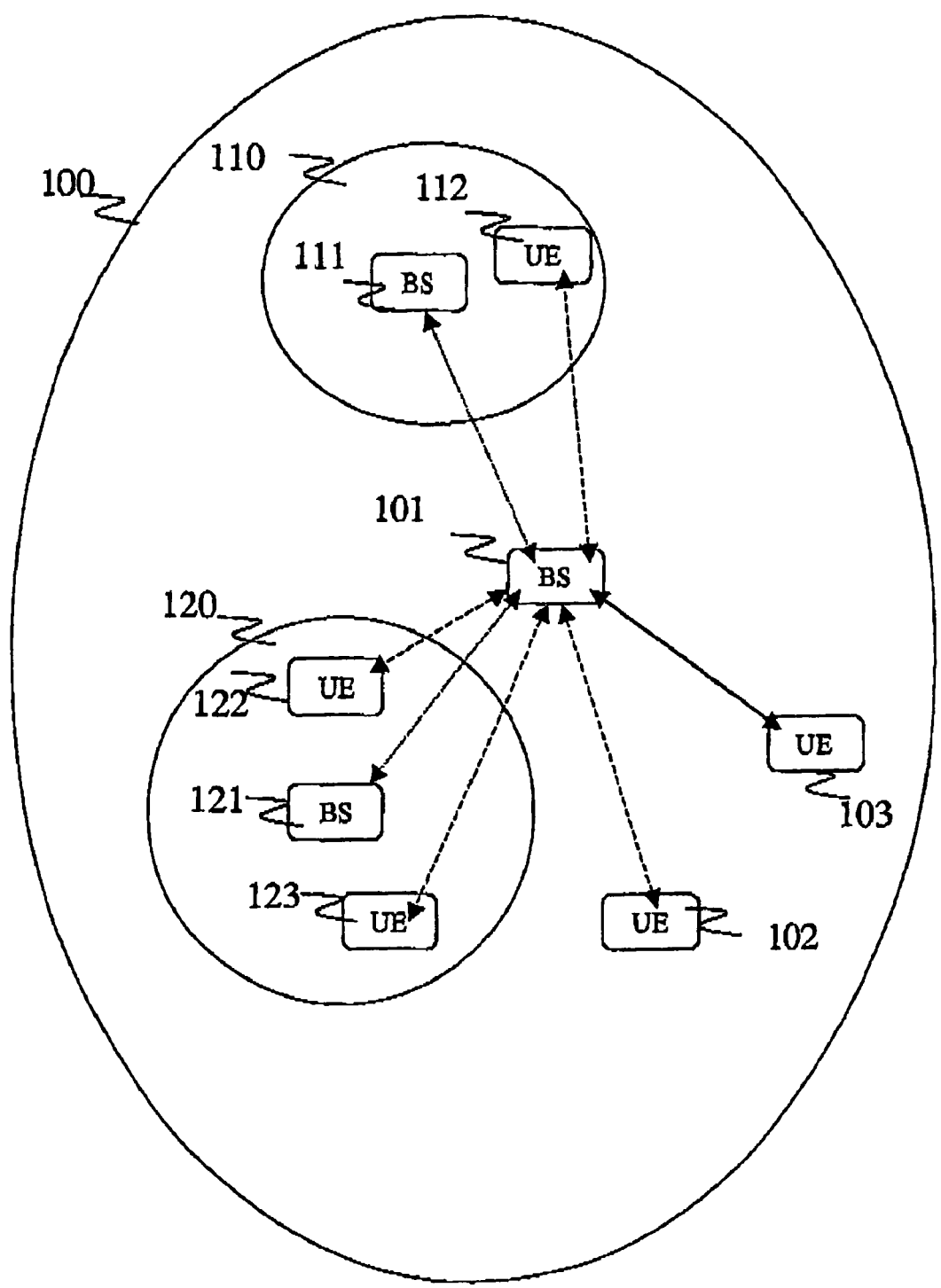
FIG. 1 shows a block diagram of the network according to a particular embodiment of the invention.

The problem of changing cells is related to the necessary temporal re-synchronisation of a terminal in communication on the new cell.

The general principle of the invention consists of simplifying this operation and is therefore based particularly on:

- synchronisation or pseudo-synchronisation of adjacent cells or partially or entirely superposed cells (particularly the case of a large cell surrounding a small cell); and
- the fact that the distance between a terminal and a base station in the cell to which the "hand-over" is being made is sufficiently small to consider that the terminal does not need to listen to synchronisation channels (SCH) of this base station.

Note that synchronisation between the cells according to the approach used in the invention does not need very high precision and pseudo-synchronisation may be sufficient. Pseudo-synchronisation in this context means synchronisation with a precision of less than 50 µS and preferably less than or equal to 30 µs.

In particular, this pseudo-synchronisation may be obtained by:

- using a wire link between two stations each associated with one of the two cells (this link possibly being dedicated to synchronisation or a link used to transport data); or
- a first base station listening to and processing the synchronisation signal transmitted by a second base station on a synchronisation channel.

Note that user terminals consist particularly of mobile or fixed wireless equipment (for example mobile telephones or any other equipment (for example portable computers) containing a wireless communication system).

There is no need for two cells to be re-synchronised with respect to each other frequently when the cells can be pseudo-synchronised, by a first base station attached to a first cell listening to and processing the synchronization signal transmitted by a second base station attached to a second cell on a synchronisation channel (SCH) and taking account of the very small drifts in the frequency references of the base stations.

Furthermore, since the distance between the terminal and a base station to which the "hand-over" procedure is used is relatively small, consequently the time uncertainty for synchronisation is short and therefore the synchronisation phase of the destination cell during the "hand-over" takes place only by listening to the CPICH (Common PIlot CHannel) channel and not the SCH channel, these two channels being associated with the base station of the destination cell.

The CPICH channel is used according to the UMTS standard to determine the phase and to search for the different echoes of a synchronised cell.

In the context of the invention, the CPICH channel is also used as a synchronisation channel.

Note that the electronic part of the terminal used to search for the different echoes of a synchronised cell may be used to synchronise on a cell if asynchronism is not too great.

UMTS terminals are designed to search for the different echoes of a cell at about plus or minus 26 µs around the known echo, that is theoretically the direct path if there is one.

Therefore, the use of the CPICH channel provides a means of synchronising a cell for which synchronisation is known to within plus or minus 26 microseconds.

In the context of the invention, these 26 microseconds must correspond to the synchronisation error between the two cells (the two cells may be pseudo-synchronised as mentioned above), and to the uncertainty related to the unknown propagation time in the destination cell.

Therefore, it is important that the destination cell should be small, for example the propagation time in a cell with a radius of 3 km is between 0 µs (if the terminal is very close to the base station) and about 10 µs if the terminal is at the boundary of the cell.

It is important to note that the invention does not require that all cells in UMTS networks should be adapted. Some cells in the same network may operate using the mechanism according to the invention, while other cells are not pseudo-synchronised.

We will now describe a block diagram of a mobile radiotelephony network using the invention, with reference to FIG. 1.

For example, the network may be compatible with the UMTS (Universal Mobile Telecommunication System) standard defined by the 3GPP committee.

The network includes a large cell 100 (macro-cell) managed by a base station 101 (BS).

This cell 100 surrounds two smaller cells 110 and 120 ("micro-cell" or "pico-cell").

Each of the cells 110 and 120 comprises a base station 111 and 121 respectively, that can manage communications inside the corresponding cell.

Note for illustration purposes that several items of equipment (UE) are present inside cell 100. Some of these items of equipment are also present. in one of the small cells 110 and 120.

Thus, the terminal 112 is inside the cell 110 and can therefore receive or transmit signals from or to the base stations 101 and 111.

Similarly, terminals 122 and 123 are inside cell 120 and can therefore receive or transmit signals from or to the base stations 101 and 121.

However, terminals 102 and 103 present in the cell 100 but not present in one of cells 110 and 120 can either transmit signals from or to the base station 101 but not from or to base stations 111 or 121.

In FIG. 1, the connections between the different elements of cell 100 are represented, at a given instant:

in thin dashed lines for connections between base stations;
in thick dashed lines for connections between the base station 101 and the terminals in standby state (terminal 112, 122, 123 and 102 according to the example in FIG. 1); and
in solid lines for communication links (link between terminal 103 and the base station 101).

Note that some terminals are in standby mode, in other words in a mode in which the terminal is not in communication mode but is present and available for a communication in one of cells 100, 110 or 120. In particular, these terminals are listening to signals transmitted by the base station 101 belonging to macro-cell 100. These signals are transmitted on:

common transport channels corresponding to services offered to high layers of the communication protocol, particularly on BCH ("Broadcast CHannel") channels and PCH ("Paging CHannel") channels; and
common transport channels corresponding to the physical layer of the communication protocol, particularly on CPICH ("Common PIlot CHannel") channels.

Note also that in standby mode, terminals are not listening to the dedicated channels.

On the other hand, the terminal 103 is not in standby mode because it is in communication with the base station 101 on a Dedicated CHannel (DCH) which is an up and down channel at the same time.

The channels used by 3GPP networks are well known to those skilled in the art for mobile networks and in particular are specified in the "$3^{rd}$ Generation Partnership Project, Technical Specification Group Radio Access Network; Physical Channels and mapping of transport channels onto physical channels (FDD) release 1999" standard reference 3GPP TS25.211 and published by the 3GPP publications office. Therefore, these channels are not described here in more detail.

Figure 2:
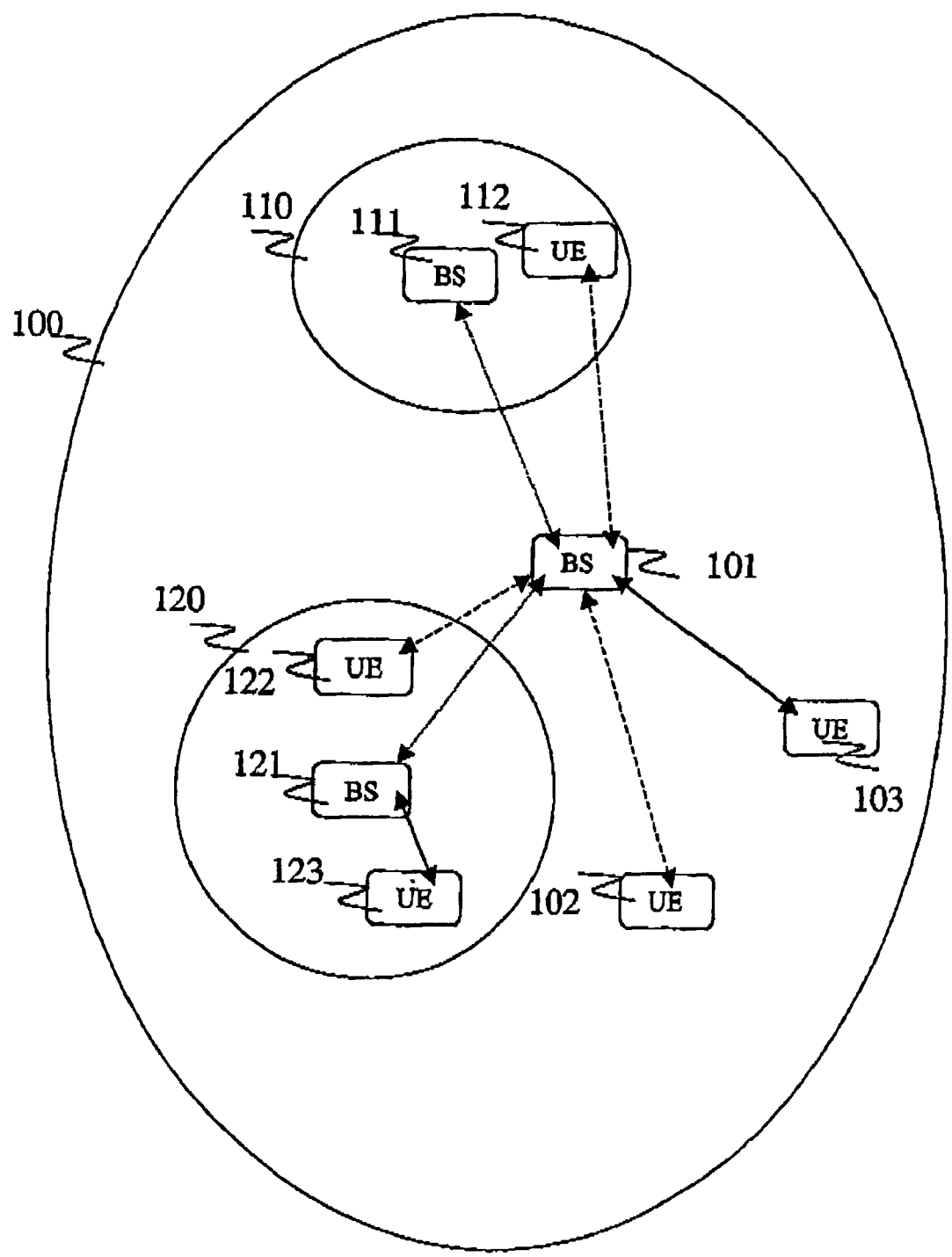
FIG. 2 illustrates the network in FIG. 1 after a communication has been set up between a terminal and a base station associated with a micro-cell.

FIG. 2 shows the network in FIG. 1 when some time has elapsed and notably after a communication has been set up between the terminal 123 and the base station 121 inside the micro-cell 120.

Note that according to FIG. 2, the terminal 123 is directly connected to the base station 121 through an up or down dedicated channel DCH enabling transport of the channel and/or exchanged data.

Figure 3:
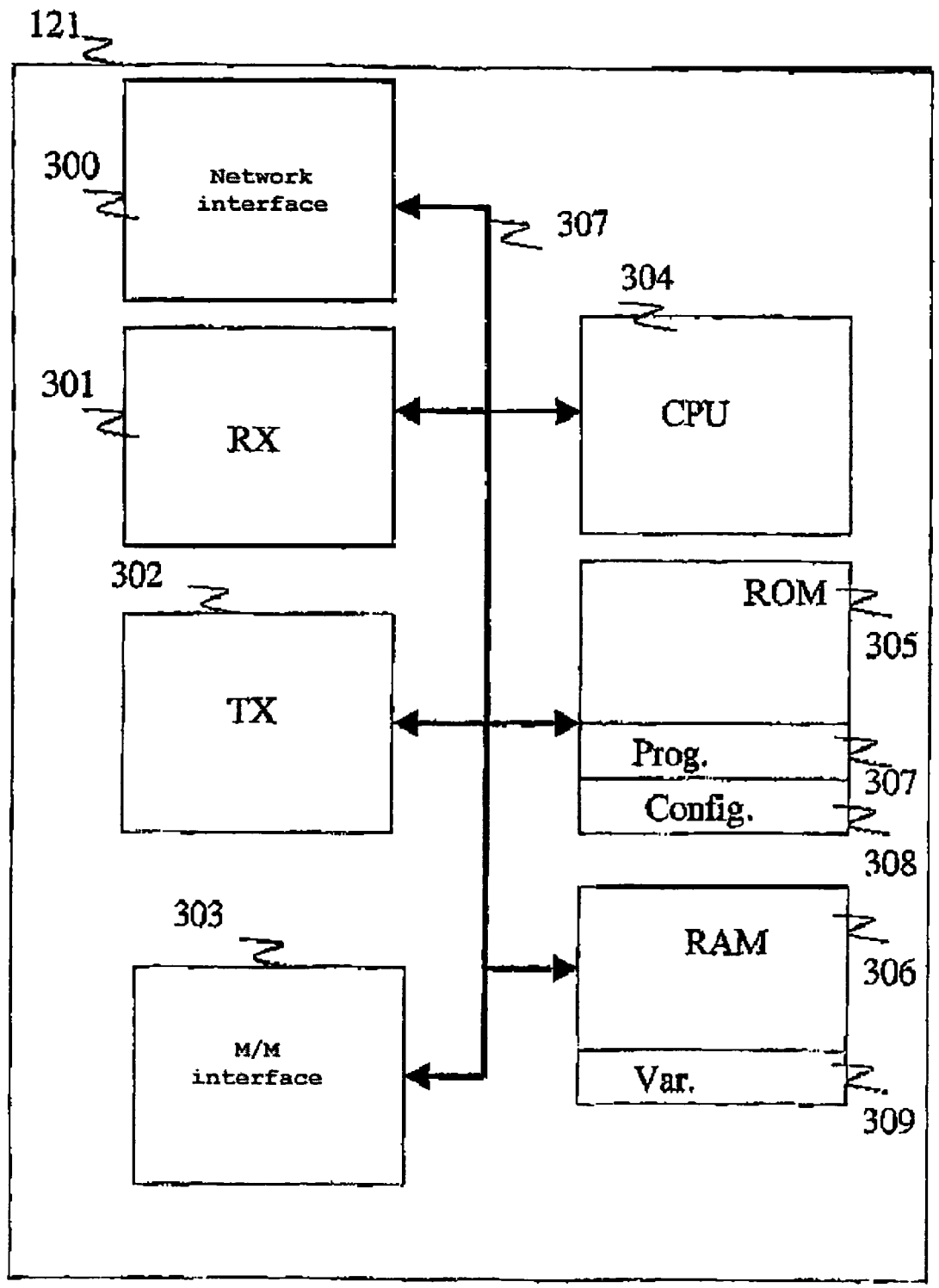
FIG. 3 describes a "micro-cell" base station in the network illustrated in FIGS. 1 and 2.

FIG. 3 diagrammatically illustrates the base station 121 as illustrated with respect to FIGS. 1 and 2.

The base station 121 comprises the following, connected to each other by an address and data bus 307:

a processor 304;
a RAM 306;
a non-volatile memory 305;
a wire network interface 300 making a connection to a fixed infrastructure of the mobile network or to other networks;
a radio reception interface 301 for receiving signals transmitted by terminals in communication with the base station 121 on dedicated up channels and signals transmitted by the base station 101, notably on the Synchronisation CHannel SCH (note that the existing UMTS standards do not require that the SCH channel is listened to only by user equipment and not by a base station);
a transmission radio interface 302 for transmitting signals on dedicated down channels and on common transport channels corresponding to the physical layer (and not to upper-layers of the communication protocol) (particularly CPICH channel); and
a man/machine interface 303 enabling a dialog with the machine for control and maintenance.

The RAM 306 stores data, variables 309 and intermediate processing results.

The non-volatile memory 305 keeps the following in registers which, for convenience, have been given the same names as the data stored in them, and among other:

the operating program of the processor 304 in a "prog" register 310 and
configuration parameters 311 for the base station 121.

Note that the base station 121 is implemented more easily than the base station 101 and in particular includes a simpler operating program than the operating program of the base station 101 since it does not include common channel functions that the base station 121 does not need to manage.

Note that a terminal (not shown) includes the following, connected to each other by an address and data bus:

a processor;
a RAM;
a non-volatile memory;
a radio reception interface for synchronising in standby mode onto an SCH type signal transmitted by the base station 101, and then in communication mode onto a CPICH type signal transmitted by the base station 121 and in general receiving signals transmitted by the base stations 101 and 121 on dedicated down channels;

a transmission radio interface for transmitting signals on dedicated up channels and on common up transport channels; and a man/machine interface enabling a dialog with the machine for control and maintenance.

Figure 4:
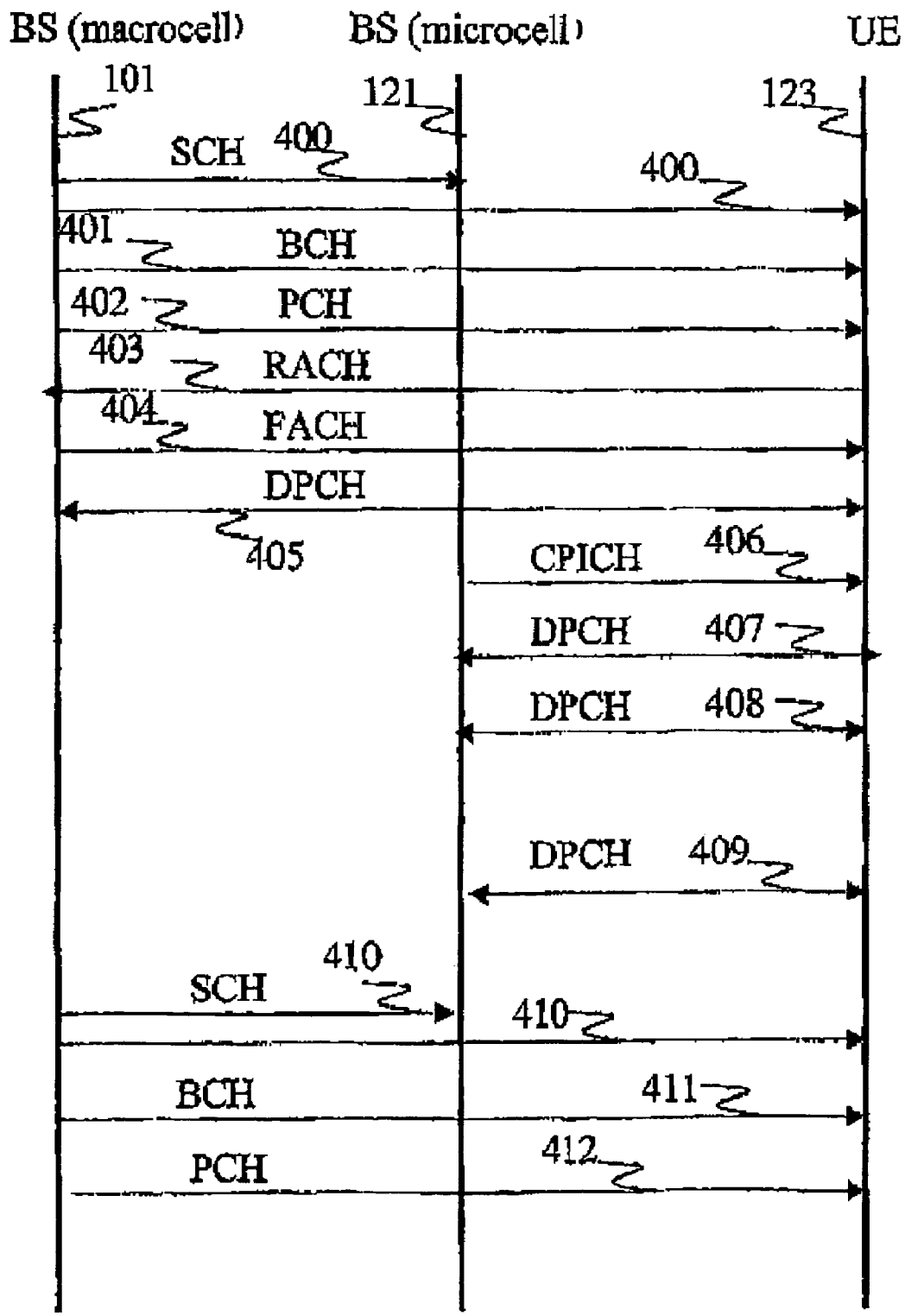
FIG. 4 illustrates a communication protocol between different elements of the network enabling the change over from a situation illustrated in FIG. 1 to a situation illustrated in FIG. 2.

FIG. 4 illustrates a communication protocol between base stations 101 and 121 and the terminal 123 when changing from the situation illustrated with reference to FIG. 1, in which the equipment 123 is in standby mode, to a situation illustrated with reference to FIG. 2, in which the equipment 123 is in communication with the base station 121.

The base station 101 transmits a signal 400 on the SCH down channel to base stations and terminals present in the macro-cell 100 and particularly from the base station 121 and the terminal 123. Thus, the base station 121 and the terminal 123 (which according to FIG. 1 is in standby mode) are synchronised on the SCH channel of the base station 101.

Note that the base station 101 transmits this SCH signal regularly and that as soon as the pseudo-synchronisation of the base station 121 degrades beyond a certain predetermined threshold, the base station 121 resynchronises itself on the base station 101.

Note also that the base stations 101 and 121 are fixed and therefore that the signal propagation time between these two stations is known. Thus, knowledge of this propagation time can be used to improve the synchronisation of the terminal on the base station 121, by using:

a synchronisation delay of the base station 121 with respect to this SCH signal transmitted by the base station 101, for example this delay being equal to the propagation time of the SCH signal between base stations 101 and 121; and/or a "hand-over" signal (signal 405 described in detail later) transmitted to the terminal 123 and transporting information indicating the synchronisation position.

The base station 101 also transmits a signal 401 on the BCH channel. This down signal indicates which PCH channel the terminal 123 should listen to. Thus, after reception of this signal, the terminal 123 listens to the PCH channel indicated by the signal 401.

The base station 101 then transmits a signal to terminal 123 on the PCH channel indicated by the signal 401, this signal being used to detect an incoming call.

Then, assuming that the terminal 123 wants to initialise a communication, it transmits a signal 403 on the RACH channel ("Random Access CHannel" which is a common channel corresponding to a high layer channel access service), this signal 403 notifying the base station 101 that the terminal 103 is requesting that a communication should be set up.

The base station 101 then transmits a communication channel allocation signal 404 on the FACH channel ("Fast Access CHannel" which is also a common channel corresponding to a high layer service).

Communication is then set up between the terminal 123 and the base station 101. One or several signals 405 containing data corresponding to an equipment application and then control data dedicated to the handover are thus exchanged on the bi-directional channel DPCH.

Note that the hand-over for carrying a communication from terminal 123 to the base station 121 is made following a network decision (particularly by the RNC (Radio Network Controller) connected to base stations 101 and 121) as a function of many criteria, particularly the throughput, the communication quality and specific features of the base station 121 (particularly the fact that it is well adapted to managing high throughput communications).

The network situation then becomes like that illustrated with respect to FIG. 2.

The terminal 123 then listens to the pilot channel 406 CPICH which, according to the invention, is used to refine the synchronisation of terminal 123. If cell 120 is small and the base station 121 is pseudo-synchronised on station 101 (in other words if synchronisation between cells 120 and 100 is coarse and imperfect, the synchronisation error being less than about 20 or 30 µs, then the synchronisation error in the synchronised networks, known in themselves, is less than 5 µs), the resulting synchronisation error between the terminal 123 and the base station 121 may be compensated by using the signal 406. The terminal 123 comprises means of making use of the multiple paths affecting a signal transmitted by a base station (this multiple paths phenomenon is well known to those skilled in the art and is the result in particular of reflections of a signal on obstacles and transmitted in several directions, the different received signals originating from the same transmitted signal but that have followed different paths, in general have different amplitudes and are out of phase). Note in particular that a "rake" type receiver can be used to determine the different delays affecting a multi-path signal. Thus, if the delay is not too large (in other words is less than 20 µs in the context of the 3GPP standard), the equipment 123 is capable of synchronising itself on the base station using the CPICH channel.

Thus, assuming that a first path is located at a precise instant that depends on the synchronisation with the base station 101, the receiver of terminal 123 fixing itself on this hypothetical path searches for at least one path corresponding to a signal transmitted on the CPICH channel of the base station with means also used for the determination of multiple paths in a signal transmitted on a CPICH channel. This is possible because synchronisation differences between the terminal 123 and each of the base stations 101 and 121 are small. The path or one of the determined paths is then used as the basis for synchronisation (synchronisation base) of the terminal 123 onto the base station 121.

Note that in the context of the 3GPP standard, the CPICH can be used to process multi-paths with a delay of 20 µs, which provides a means of compensating for an error when the radius of the small cell is less than or equal to about 6 km (namely the delay equal to approximately 20 µs in this case multiplied by the speed of light).

Note also that when it is synchronised on the base station 121, the terminal 123 maintains slaving on this synchronisation through the CPICH channel managed by the base station 121.

The terminal 123 and the base station 121 then exchange data on the dedicated channels DPCH through several signals 407 to 409, of which only a small part has been shown.

At the end of the communication, the terminal 123 and/or the base station 121 indicate that the communication has terminated, through the signal 409.

According to one variant that has not been shown, the network imposes that the terminal should make a "hand-over" to the base station 101 before the end of communication. Note that this "hand-over" can be made quickly with synchronisation on the CPICH signal transmitted by the base station 101 since the terminal is synchronised on the base station 121 which is itself pseudo-synchronised on the base station 101.

Therefore, the equipment 123 goes back into standby mode and the situation then returns to the situation illustrated with reference to FIG. 1.

The base station 101 then transmits signals 410, 411 and 412 on the SCH, BCH and PCH channels respectively, these signals being similar to signals 400, 401 and 402 respectively described above.

Figure 5:
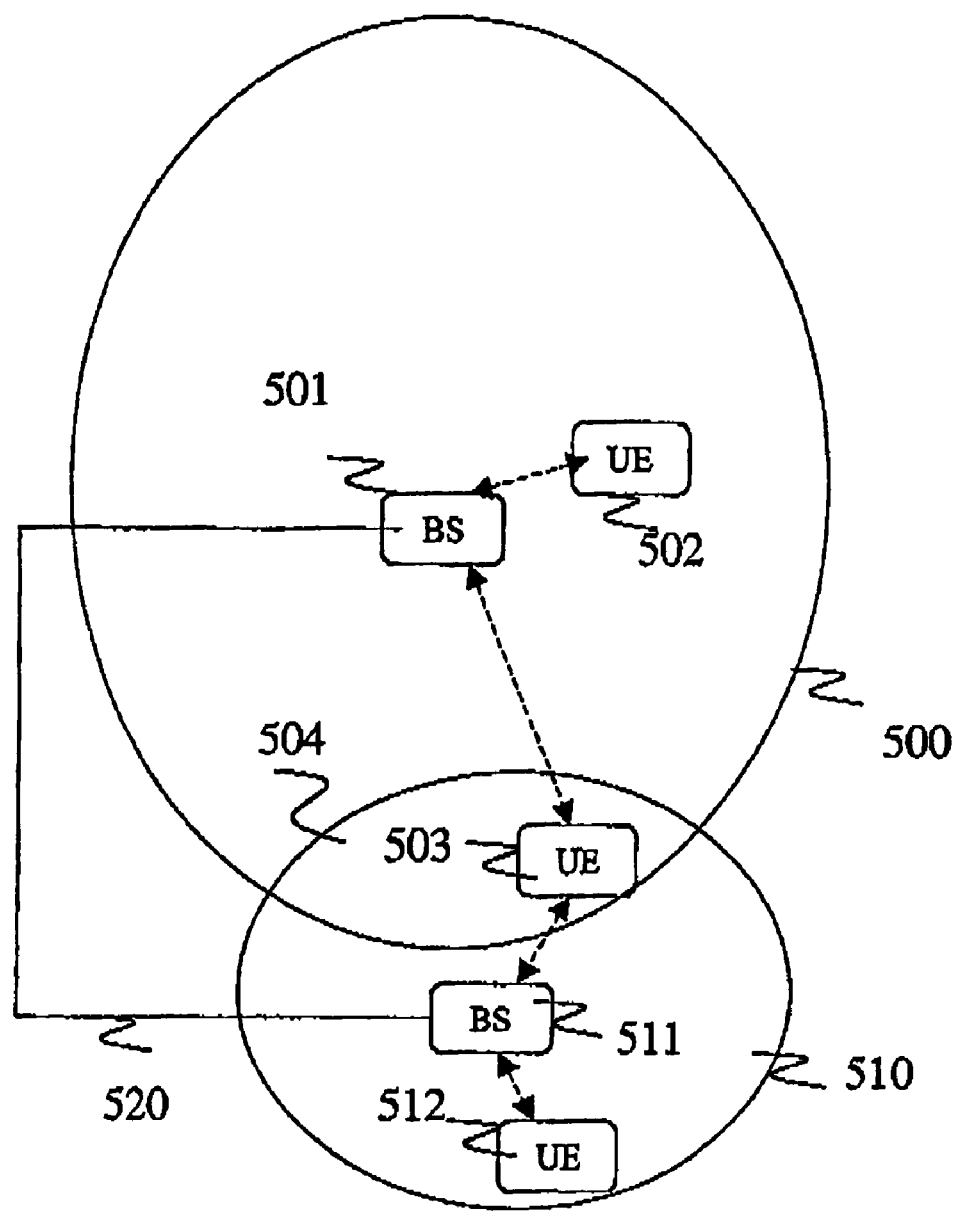
FIG. 5 shows a block diagram of the network according to a variant embodiment of the invention.

We will now describe a block diagram of the mobile radio-telephony network in relation to FIG. 5, using one variant embodiment of the invention.

For example, the network is compatible with the UMTS ("Universal Mobile Telecommunication System") standard defined by the 3GPP ("3rd Generation Partnership Project") committee.

The network includes two cells 500 and 510 that cover a geographically common area 504, the cell 510 being sufficiently small to consider that the terminal 503 does not need to listen to synchronisation channels SCH of the station 510 to synchronise on this station when it is synchronised on station 501.

Each of the cells 500 and 510 includes a base station 501 and 511 respectively, capable of managing communications inside the corresponding cell.

Note, for illustration, that several items of equipment (UE) are present in at least one of the cells 500 and 510, a terminal 503 being present in the common area 504.

Thus, the terminal 503 can receive or transmit signals from or to the base stations 501 and 511.

In FIG. 5, the connections between the different elements of the cell 500 have been shown, at a given instant:
  radio links shown in thin dashed lines for connections between base stations 501 and 511 and terminals 502, 503 or 512; and
  wire link 520 shown in solid lines between base stations 501 and 502.

For example, the wire link 520 is a dedicated line connecting the two base stations 501 and 511 or part of a fixed network capable of transporting synchronisation signals and possibly data.

Thus, note that the terminal 503 is in standby mode, in other words, it is in mode in which it is not in communication mode but it is present and available for communication in one of cells 500 or 501. Therefore, the terminal 503 is listening particularly to signals transmitted by the base station 501 belonging to cell 500. These signals are transmitted on:
  common transport channels corresponding to services offered to high layers of the communication protocol, particularly on BCH ("Broadcast CHannel") channels and PCH ("Paging CHannel") channels; and
  common channels corresponding to the physical layer of the communication protocol, particularly on the SCH channel and the CPICH ("Common PIlot CHannel") channel.

Note also that in standby mode, the terminals are not listening to the dedicated channels.

Those skilled in the art for mobile networks will be familiar with the channels used by 3GPP networks that in particular are specified in the "3rd Generation Partnership Project; Technical Specification Group Radio Access Network; Physical Channels and mapping of transport channels onto physical channels (FDD) release 1999" standard reference 3GPP TS25.211 and published by the 3GPP publications office. Therefore these channels are not described in more detail here.

Furthermore, note that the base stations 501 and 511 are very similar to the base station 121 illustrated with reference to FIG. 3, a wire network interface enabling a link 520 to the other base station (511 and 501 respectively) and to a fixed infrastructure of the mobile network or other networks.

Note also that the terminals used in this variant of the invention are similar to the terminals used in the first embodiment of the invention described above.

Therefore, base station or equipment type devices will not be described in more detail here.

Figure 6:
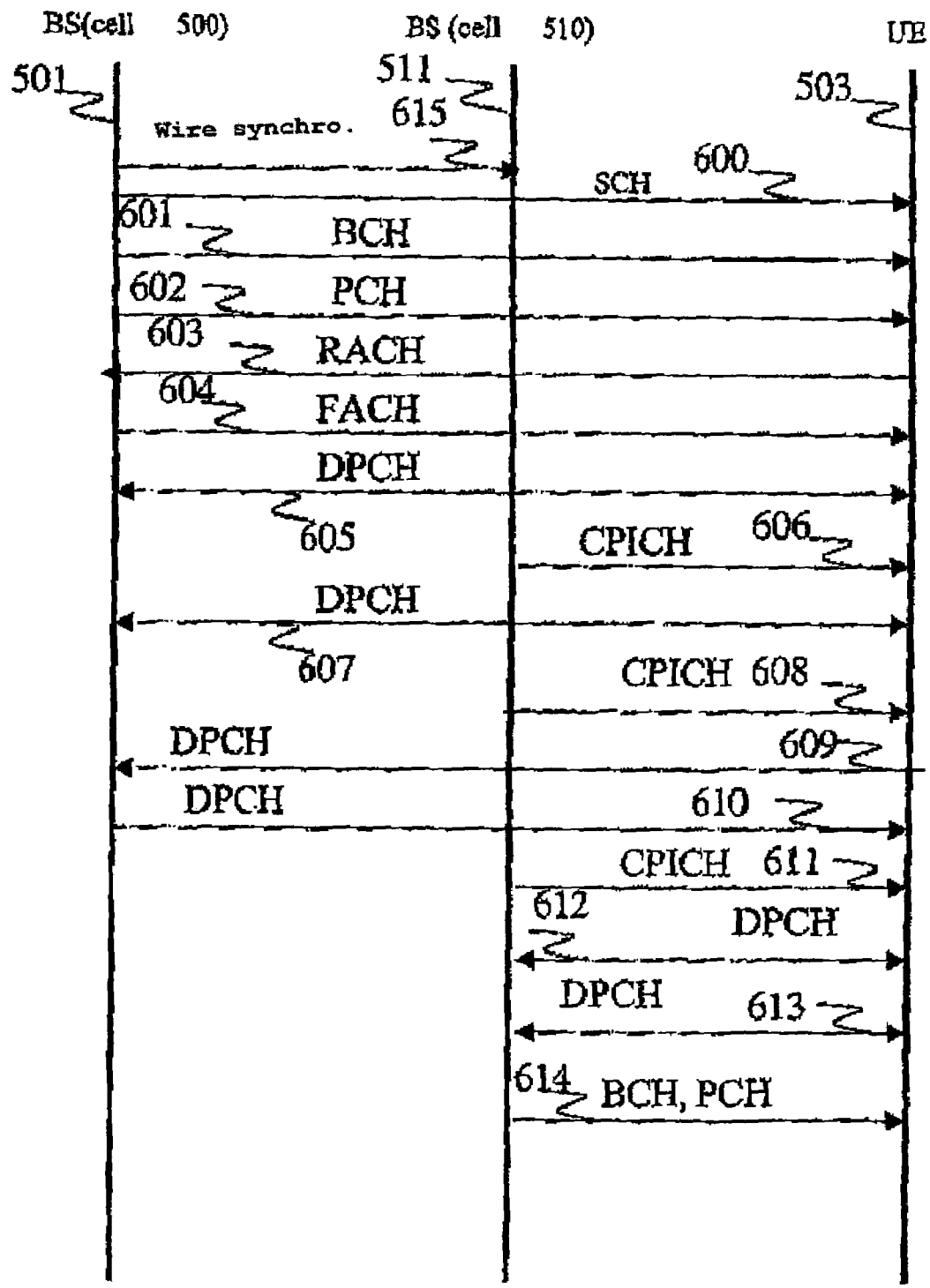
FIG. 6 illustrates a communication protocol between different elements of the network in FIG. 5 during a fast "hand-over" procedure.

FIG. 6 illustrates a communication protocol between base stations 501 and 511 and terminal 503 during a "hand-over" of terminal 503 from cell 500 to cell 501.

According to the embodiment of the invention described in FIG. 5, the base station 511 does not synchronise on the SCH channel of the base station 501. The radio reception interface of the base station 521 provides a means of receiving signals transmitted by terminals in communication with the base station 511 on dedicated up channels and does not receive signals transmitted by the base station 501 on a radio medium, particularly on the radio Synchronisation CHannel SCH when the base station 501 is not in the common area 504.

On the other hand, the base station 511 receives a synchronisation signal 615 transmitted by the base station 501 on the wire link 520.

The synchronisation signal 615 is used according to techniques known to those skilled in the art (for example pulse according to a given rate or a particular bit sequence on which the base station 511 fixes its own synchronisation). Therefore, this synchronisation signal will not be described in more detail here.

Note however that, according to the invention, this synchronisation signal may take account of the propagation times of this signal to optimise synchronisation of base stations with each other.

Note also that the fact that the terminal is located in a geographically limited area 504 may be used to improve synchronisation of the terminal on the base station 511. In particular, it is possible to take account of the difference firstly in the propagation time between the terminal 503 and the base station 501, and secondly the difference in the propagation time between the terminal 503 and the base station 511, by using compensation means and particularly:
  a synchronisation signal controlling the base station 511 that takes account of this difference; and/or
  a "hand-over" signal (signal 610 illustrated later) transmitted to equipment 123 and transporting information indicating the synchronisation position.

Note also that the synchronisation signal 615 is regularly transmitted by the base station 501 and that as soon as the pseudo-synchronisation of the base station 511 degrades below a predetermined threshold, the base station 511 re-synchronises itself on the base station 501 from the signal 615.

The base station 501 also transmits a signal 600 on the down channel SCH to terminals present in the cell 500 and particularly terminal 503. Thus, terminal 503 (which is supposed to be in standby mode) is synchronised on the SCH channel of the base station 501.

The base station 501 also transmits a signal 601 on the BCH channel. This down signal informs the terminal 503 which PCH channel it should listen to. Thus, after receiving this signal, the equipment 503 listens to the PCH channel indicated by the signal 601.

The base station 501 then transmits a signal to terminal 503 on the PCH channel indicated by the signal 601, this signal being used to detect an incoming call.

Then, assuming that the terminal 503 wants to initialise a communication, it transmits a signal 603 on the RACH channel ("Random Access CHannel" that is a common channel corresponding to a high layer channel access service), this signal 603 notifying the base station 501 that the terminal 503 is requesting that a communication should be set up.

The base station. 501 then transmits a communication channel allocation signal 604 on the FACH channel (Fast Access CHannel, that is also a common channel corresponding to a high layer service).

The communication is then set up between the terminal 503 and the base station 501.

Thus, one or several signals 605 containing data corresponding to a terminal application are exchanged on the bi-directional channel DPCH.

At the same time, the terminal 503 listens to the CPICH channel of cell 510 (signal transmitted by the base station 511) to make measurements of the power received on signals transmitted by the base station 511.

The terminal then transmits the result of this measurement to the base station 501 by a DPCH type signal 607.

Terminal 503 then listens again to the CPICH channel of cell 510 and the power measurement is repeated, during a step 608.

The terminal 503 then transmits the result of this measurement to the base station 501 in a DPCH type signal 609.

The network (particularly the RNC (Radio Network Controller) connected to base stations 501 and 511) then makes the decision to make a "hand-over" based on measurements communicated to the base station 501. Therefore the station 501 transmits a signal 610 transported on a DPCH channel and notifying. the terminal 503 that it should listen to a DPCH channel in cell 510.

Since the terminal 503 is synchronised on the SCH channel transmitted by the station 501, the base station 511 being pseudo-synchronised on station 501 and the cell 510 being small, the terminal is also pseudo-synchronised on the station 511 with a synchronisation error not exceeding the sum of:

the difference between its own synchronisation on station 501 and the pseudo-synchronisation of station 511 on station 501; and the delay due to propagation of signals from station 511 to terminal 503.

Note that this difference can be reduced by the use of compensation means illustrated above.

The terminal 503 then listens to the pilot channel 611 CPICH that, according to the invention, refines the synchronisation of terminal 503. If the cell 510 is small and if the base station 511 is pseudo-synchronised on station 501 (in other words if synchronisation between cells 500 and 510 is coarse and not perfect, the synchronisation error being less than about 20 or 30 μs, then the error on synchronisation in synchronised networks, known in themselves, is less than 1 or 2 μs), the resulting synchronisation error between the terminal 53 and the base station 511 can be compensated by using the signal 611.

Note that this operation to synchronise terminal 503 on station 511 takes place very quickly even if a frequency change is necessary during "hand-over".

Note also that when the terminal 503 is synchronised on the base station 511, it maintains slaving on this synchronisation through the CPICH channel managed by the base station 511.

The terminal 503 includes means of taking advantage of the multiple paths affecting a signal transmitted by a base station. In particular, note that a "rake" type receiver is capable of determining different delays affecting a multi-path signal. Thus, if the delay is not too great (in other words less than 20 μs in the context of the 3GPP standard), the terminal 503 is capable of synchronising itself on the CPICH channel.

Note that in the context of the 3GPP standard, the CPICH is capable of processing multi-paths with a delay of 20 μs, which provides a means of compensating for an error when the radius of the small cell is less than or equal to about 6 km (namely in this case the delay equal to the order of 20 μs multiplied by the speed of light).

The terminal 503 and the base station 511 then exchange data on dedicated channels DPCH by means of several signals 611 and 612, a small part of which has been shown.

At the end of the communication, the terminal 503 and/or the base station 511 outputs signal 612 to indicate that the communication is terminated.

Therefore, the terminal 503 returns to standby mode.

The base station 511 then transmits signals 614 on the SCH, BCH and PCH channels, these signals being similar to the signals 600, 601 and 602 respectively described above.

Note that terminal 503 is still managed by cell 510.

According to one variant that is not shown, when the terminal is in standby mode and is in the common area 504, it listens to common channels specific to cell 500.

Obviously, the invention is not limited to the example embodiments mentioned above.

In particular, those skilled in the art could make any variant to the way in which two cells are pseudo-synchronised. Thus, it could be considered that the base station of one cell receives a synchronisation signal transmitted by a base station in another cell, for example using a wire link or a radio link (particularly an SCH channel).

Nor is the invention limited to the case in which two base stations are pseudo-synchronised by means of a signal transmitted by one of them to the other, but it could include the case in which a third equipment (for example NCS managing the two base stations or dedicated third equipment) transmits a synchronisation signal to both base stations.

Note that the invention is not limited to the UMTS or 3GPP networks, and is applicable to any cellular network.

Note that the invention is not limited to a purely hardware installation, but it can also be implemented in the form of a sequence of instructions in a computer program or in any hybrid form comprising a hardware part and a software part. If the invention is partially or completely implemented in a software form, the corresponding sequence of instructions could be stored in a storage means that is removable (for example such as a floppy disk, a CD-ROM or a DVD-ROM) or is not removable, this storage means being partially or completely readable by a computer or a microprocessor.

The invention claimed is:

1. A synchronization method of a terminal in a cellular communication network comprising a plurality of cells, including a first cell and a second cell associated respectively with a first and a second base station, said first and second cells at least partly overlapping in a common geographical area and being synchronized, wherein the synchronization method includes, when said terminal is present in said common geographical area:

a first synchronization step on a synchronization signal transmitted by said first base station and received by said terminal; and a second synchronization step on a predetermined signal transmitted on a CPICH channel dedicated to the processing of multiple paths, and transmitted by said second base station and received by said terminal, and wherein said terminal comprises:

analyzing the multiple paths followed by said predetermined signal;

determining a path corresponding to said predetermined signal transmitted by said second base station, called first path;

supplying said second synchronization step with the first path, considered as a base for the second synchronization step.

2. The synchronization method according to claim 1, wherein said first synchronization step tolerates synchronization errors of the order of 5 to 50 microsecond (µs) relative to said second base station.

3. The synchronization method according to claim 1, wherein said first synchronization step tolerates synchronization errors of the order of 5 to 30 microsecond (µs) relative to said second station.

4. The synchronization method according to claim 1, wherein said second synchronization step tolerates synchronization errors of less than 5 microsecond (µs) relative to said second base station.

5. The synchronization method according to claim 1, wherein said first base station transmits synchronization information to said second base station enabling synchronization of said second base station on said first base station.

6. The synchronization method according to claim 5, wherein said synchronization information is transmitted on a wire link.

7. The synchronization method according to claim 5, wherein said synchronization information is transmitted through said synchronization signal transmitted by said first base station.

8. The synchronization method according to claim 1, wherein a third piece of equipment transmits synchronization information to said first base station and to said second base station enabling said second base station to be synchronized on said first base station.

9. A method of hand-over transfer of a terminal in a cellular communication network comprising a plurality of cells, including a first cell and a second cell associated respectively with a first base station and a second base station, said first and second cells at least partly overlapping in a common geographical area and being synchronized, and said terminal being either in a communication mode when a communication has been set up between the terminal and a remote terminal, or in standby mode when said terminal is not in communication mode but is present and is available for a communication in one of the network cells, wherein said terminal is present in said common geographical area, said method comprises:

a first synchronization step on a synchronization signal transmitted by said first base station and received by said terminal;

a second synchronization step on a predetermined signal transmitted on a CPICH channel dedicated to the processing of multiple paths, and transmitted by said second base station and received by said terminal;

when said terminal in communication mode with said first base station is transferred from said first cell to said second cell, and wherein said terminal comprises:

analyzing the multiple paths followed by said predetermined signal;

determining a path corresponding to said predetermined signal transmitted by said second base station, called first path;

supplying said second synchronization step with the first path, considered as a base for the second synchronization step.

10. The method of hand-over according to claim 9, wherein the method of hand-over uses a synchronization method that includes, when said terminal is present in said common geographical area:

a first synchronization step on a synchronization signal transmitted by said first base station and received by said terminal; and a second synchronization step on a predetermined signal transmitted on a CPICH channel dedicated to the processing of multiple paths, and transmitted by said second base station and received by said terminal, and wherein said terminal comprises:

analyzing the multiple paths followed by said predetermined signal;

determining a path corresponding to said predetermined signal transmitted by said second base station, called first path;

supplying said second synchronization step with the first path, considered as a base for the second synchronization step.

11. The method of hand-over according to claim 9, wherein said first cell surrounds said second cell and in that said first base station manages said standby mode for terminals present in said first cell, said second base station being able to manage said communication mode.

12. The method of hand-over according to claim 11, wherein said first base station manages opening of a communication for said terminals present in said second cell, and said network then transfers management of said communication to said second base station.

13. A terminal for cooperating with at least a first base station associated with a first cell in the cellular communication network, said terminal being either in a communication mode when a communication is set up between said terminal and a remote terminal, or in a standby mode when said terminal is not in communication mode but is present and available for a communication in one of said network cells, wherein the terminal comprises:

first equipment configured to make a first synchronization on a synchronization signal transmitted by said first base station and received by said terminal;

second equipment to make a second synchronization on a predetermined signal transmitted on a CPICH channel dedicated to processing of multiple paths, and transmitted by a second base station and received by said terminal;

said second equipment comprising:

analyzing the multiple paths followed by said predetermined signal;

determining a path corresponding to said predetermined signal transmitted by said second base station, called first path;

supplying said second synchronization step with the first path, considered as a base for the second synchronization step.

a second cell in said network configured to be associated with said second base station; and said first and second cells configured to be at least partly overlapping and synchronized.

14. The terminal according to claim 13, wherein said second equipment comprises equipment configured to analyze multiple paths followed by said predetermined signal, capable of determining at least a first path corresponding to said predetermined signal transmitted by said second base station, the first path being a synchronization base.

15. The terminal according to claim 13, wherein said first synchronization includes synchronization errors of the order of 5 to 50 microsecond (μs).

16. The terminal according to claim 14, wherein said first synchronization includes synchronization errors of the order of 5 to 30 microsecond (μs).

17. The terminal according to claim 13, wherein said second synchronization includes synchronization errors of less than 5 microsecond (μs).

18. A second base station for association with a second cell in cellular telecommunication network, said network comprising a plurality of cells including a first cell associated with a first base station and at least one terminal,
 said first and second cells overlapping at least partly on a common geographical area,
 wherein said second base station comprises means of synchronization on said first base station such that at least one of said terminals:
 synchronizes on a synchronization signal transmitted by the said first base station and received by said terminal; and
 synchronizes on a predetermined signal transmitted on a CPICH channel dedicated to the processing of multiple paths, and transmitted by said second base station and received by said terminal,
 said means of synchronization comprising:
 analyzing the multiple paths followed by said predetermined signal;
 determining a path corresponding to said predetermined signal transmitted by said second base station called first path;
 supplying said second synchronization step with the first path, considered as a base for the second synchronization step.

19. A second base station according to claim 18, wherein the second base comprises means of management of a communication mode of said terminal and that it does not include means of management of a standby mode of said terminal, said terminal being either in a communication mode when a communication is set up between said terminal and a remote terminal, or in standby mode when said terminal is not in communication mode but is present and available for a communication in one of said network cells.

20. A cellular telecommunication network comprising a plurality of cells, including a first cell associated with a first base station and at least one second cell, said first cell and each of said second cells overlapping at least partly in a common geographical area and being synchronized,
 wherein each of said second cells is associated with at least one second base station according to claim 18.

* * * * *